Patented June 14, 1927.

1,632,667

UNITED STATES PATENT OFFICE.

STUART B. MOLONY, OF WELLESLEY HILLS, MASSACHUSETTS, AND YASUJURO NIKAIDO, OF BAY CITY, MICHIGAN, ASSIGNORS, BY MESNE ASSIGNMENTS, TO CHARLES W. BROWN, WILLIAM L. CLAUSE, AND EDWARD PITCAIRN, ALL OF PITTSBURGH, PENNSYLVANIA.

RUBBER VULCANIZATION AND PRODUCT THEREOF.

No Drawing. Original application filed April 12, 1920, Serial No. 373,368. Divided and this application filed September 25, 1926. Serial No. 137,812.

The invention relates to the vulcanization of rubber or caoutchouc. It has for its principal objects the provision of a process whereby the rapidity of vulcanization can be increased, whereby the time or temperature of vulcanization can be lessened, which can be practiced at a minimum of expense with a relatively small quantity of the accelerating agent, and the provision of a product which is of superior quality and durability.

In its broadest form, the invention contemplates vulcanizing rubber by treating the same with a vulcanizing agent and a dithiocarbamic compound containing aromatic and alkyl constituents. More specifically, the invention contemplates the vulcanization of rubber by combining the rubber with a vulcanizing agent and an accelerator comprising an ester of substituted dithiorcarbamic acid containing aromatic and alkyl constituents. The invention also contemplates the use of possible modifications of the metallic salts of dithiocarbamic acid set forth in the application of Y. Nikaido, Serial No. 466,999, Patent No. 1,513,122 and the use of modifications of the compounds set forth in the application of Stuart B. Molony, Serial No. 346,307, which has matured into U. S. Patent No. 1,558,707.

Such modifications are accomplished by the substitution of elements, groups, or radicals, either in the place of the metals of the salts, or the hydrogen of the acids, or in place of the hydrogen of alkyl of the amido group, or both; for instance, in the first case the substitution for the hydrogen of the acid or for the metals of the metallic salts, of other elements or groups such as alkyl groups, aromatic groups including phenyl, naphthalene, anthracene, etc., thus forming corresponding salts, i. e., esters, of the dithiocarbamic acids, and in the second case, in the amido group, the substitution for the hydrogen or alkyl groups, of other elements or groups, such as phenyl, anthracene, pyridine, cyanogen, alkyl, the various chlorides, etc., which can be substituted for the hydrogen of the amido group, either in the acids or in the metallic salts or esters.

The esters of the alkylated dithiocarbamic acids can be prepared from the amino ammonium salts of the same acid by treatment with iodoalkyls, iodophenyls, etc., when the base forming amino ammonium group $NH_2(CH_3)_2$ or $NH_3(CH_3)$ is replaced by the alkyl, phenyl, etc., groups; or the base forming $NH_3(C_6H_5)$ group, etc., can be replaced in the same way. The esters can also be prepared from chlorodithiocarbonic esters and amines as:

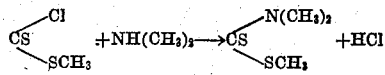

The replacement of the alkyl groups in the amido groups by hydrogen, phenyl, naphthalene, pyridine, etc., can be accomplished by the regular methods for effecting substitutions in the amido group.

Aniline salt of phenyl dithiocarbamic acid may be prepared by mixing ten parts of carbon bisulphide, twenty parts of aniline and five parts of ethyl alcohol and leaving the mixture in a current of cool desiccated air until all the alcohol and excess of carbon bisulphide are evaporated, when the liquid becomes nearly odorless. This liquid is aniline salt of phenyl dithiocarbamic acid which was formed according to the following equation:

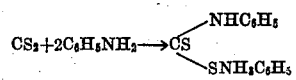

This compound is very unstable and when treated with 75% alcohol saturated with zinc sulphate, zinc salt of phenyl dithiocarbamic acid is precipitated. This salt is quite stable as repeated washings with water has no effect upon the composition of the compounds. It may be washed with water, filtered, and dried in a current of warm dry air. Other metallic salts of phenyl dithiocarbamic acid may be obtained in the like manner.

Methyl ester of phenyl dithiocarbamic acid may also be obtained by mixing phenyl mustard oil and methyl mercaptan according to the following equation:

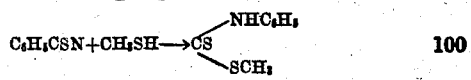

The above is a specific example of an ester of dithiocarbamic acid containing aromatic and alkyl constituents suitable for use in accelerating vulcanization, the compound being an alkyl ester of phenyl dithiocarbamic acid; more specifically, the methyl ester of phenyl dithiocarbamic acid.

The advantages to be derived from some of these substitutions are the wide range they give in the melting point not possible in the acid or metallic salts, as they are all of comparatively high melting points; and also the greater ease of manufacture.

The methods of use of the various accelerating agents herein set forth, as to the quantity employed, the time of vulcanization, the heat required and the proportions of zinc oxide, sulphur and other ingredients vary widely. As a specific illustration, we have found that the methyl ester of dimethyl dithiocarbamic salt, whose production has been described herein, may be used in substantially the same way and in the same proportions as the mixture of monomethyl dithiocarbamate of zinc and dimethyl dithiocarbamate of zinc described in the Nikaido Patent, No. 1,513,122, the formula being:

100 parts by weight of smoked ceylon, 50 parts by weight of zinc oxide, 5 parts by weight of sulphur, 1/5 parts by weight of accelerating agent.

With steam pressure of 50 pounds in a press, a good cure will be obtained in about ten minutes. At three pounds steam pressure a good cure will be obtained in a press in about forty-five minutes.

The present application is a division of Molony and Nikaido application, Serial No. 373,368, filed April 12, 1920.

We claim:

1. The process of vulcanizing rubber comprising combining the same with a vulcanizing agent and a dithiocarbamic compound containing aromatic and alkyl constituents.

2. The process of vulcanizing rubber comprising combining the same with a vulcanizing agent and a dithiocarbamate containing aromatic and alkyl constituents.

3. The process of vulcanizing rubber comprising combining the same with a vulcanizing agent and an ester of substituted dithiocarbamic acid containing aromatic and alkyl constituents.

4. The process of vulcanizing rubber comprising combining the same with a vulcanizing agent and an ester of substituted dithiocarbamic acid containing a phenyl constituent.

5. The process of vulcanizing rubber comprising combining the same with an analine ester of substituted dithiocarbamic acid.

In testimony whereof we hereunto affix our signatures.

STUART B. MOLONY.
YASUJURO NIKAIDO.